Dec. 31, 1957 H. J. SCHMITZ, JR 2,817,968
MOUNTING ARRANGEMENT FOR A THERMOMETER OR THE LIKE
Filed April 29, 1953
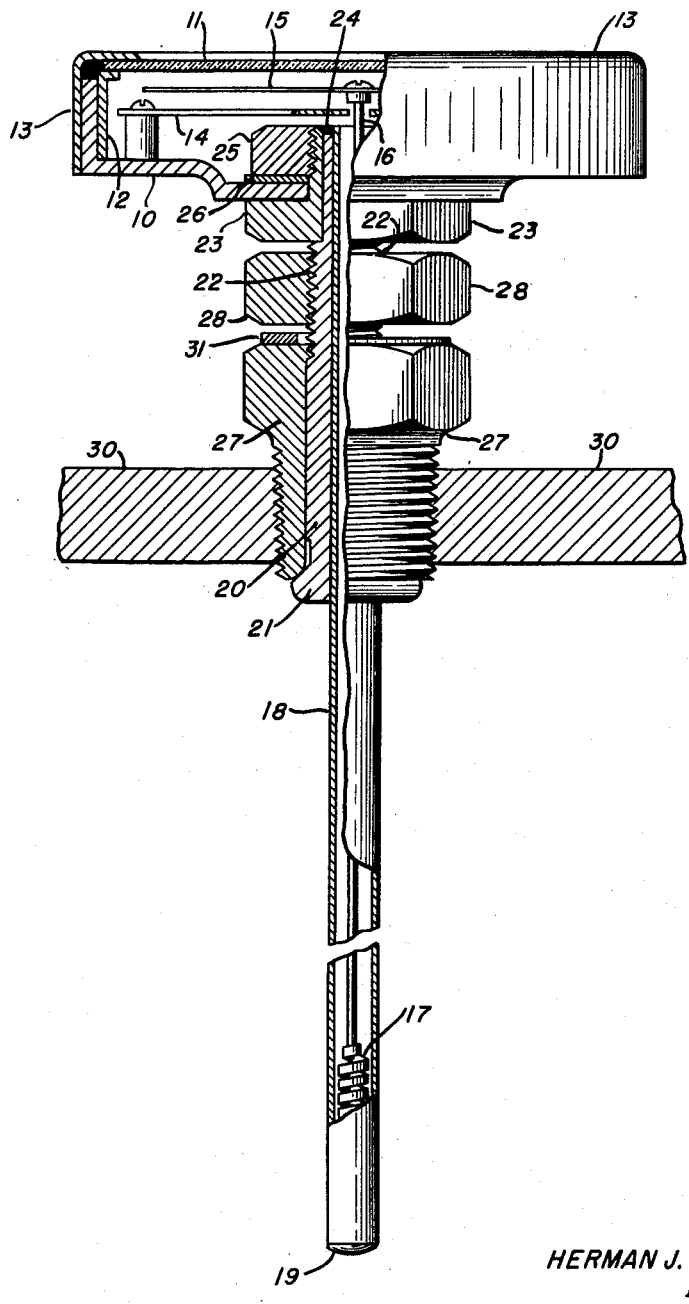
HERMAN J. SCHMITZ JR.
INVENTOR.
BY
ATTORNEYS

United States Patent Office 2,817,968
Patented Dec. 31, 1957

2,817,968

MOUNTING ARRANGEMENT FOR A THERMOMETER OR THE LIKE

Herman J. Schmitz, Jr., Westfield, N. J., assignor to Weston Electrical Instrument Corporation, Newark, N. J., a corporation of New Jersey Application April 29, 1953, Serial No. 351,830

4 Claims. (Cl. 73—363.9)

This invention relates to threaded coupling means for securing an instrument or the like to a support and more particularly to a novel, self-contained swivel connection by means of which the instrument can be attached to and removed from the support without rotation of the instrument as a whole.

While my novel swivel connection is of general utility I shall describe the device with specific reference to a bimetallic thermometer. Such thermometer comprises a stem terminating in a head. Disposed within the stem is a bimetallic, temperature-sensitive coil, wound in the form of a helix, which imparts rotation to a shaft that extends through the stem and into the head. A pointer secured to the shaft cooperates with a suitably calibrated scale to provide a direct indication of the temperature effecting the bimetallic coil. In a conventional thermometer designed for threaded mounting in a wall, or separate socket, a threaded mounting nut is secured to the instrument head. However, in such device the instrument scale may not be disposed in the desired reading position when the mounting nut is fully threaded into the wall hole or socket.

Various arrangements have been developed to permit rotation of the thermometer head to a desired orientation after the instrument has been mounted firmly in position by means of the mounting nut. These prior arrangements require a separate union or hub each of which necessarily are of relatively large size and, more importantly, are not self-contained and, therefore, subject to being mislaid or lost.

An object of this invention is the provision of a self-contained, swivel type connection for securing an instrument or the like to a support.

An object of this invention is the provision of a swivel connection for securing an instrument to a support and comprising an externally-threaded mounting lug, a sleeve member passing through a clearance hole in the lug, one end of the sleeve being secured to the instrument and the other end terminating in a flare, and a locking nut operating on a threaded portion of the sleeve member, said locking nut adapted to abut the mounting hub to thereby force the hub into a pressure-tight contact with the flared end of the sleeve.

An object of this invention is the provision of a mounting arrangement for a bimetallic thermometer of the type including a stem extending from a head, said mounting arrangement comprising a sleeve disposed over the stem and secured to the head, an externally-threaded mounting lug normally freely rotatable about the sleeve, a flared end on the sleeve, and a clamping nut operating on a threaded portion of the sleeve, said clamping nut adapted to abut the lug to thereby force said lug into pressure-tight contact with the flared end of the sleeve.

These and other objects and advantages will become apparent from the following description when taken with the accompanying drawing showing a stem-type bimetallic thermometer provided my with novel swivel-type mounting arrangement.

The thermometer head comprises a cup-shaped case 10 provided with a glass, or plastic, window 11, said window being supported on a ring bezel 12 and secured in fixed position by a clamping ring 13. Disposed within and carried by the head is a circular scale plate 14 which carries a graduated scale calibrated in temperature values. A pointer 15, secured to the end of a staff 16, cooperates with the scale to provide a direct reading of the temperature effective at the bimetallic coil 17 located within the lower end of the stem 18. Those skilled in this art will understand that one end of the bimetallic coil is secured to a plug 19 closing the stem and the other coil end is secured to the staff whereby a change in temperature causes the coil to rotate the staff.

The stem 18 passes through an axial hole in the sleeve member 20, said member including an integral flared end 2, an externally-threaded portion 22 and a reduced-diameter portion which passes through the connecting short hollow bolt or bushing 23, as shown. The stem 18, sleeve member 20 and the bushing 23 are secured together, as by brazing, to prevent relative displacement therebetween, the brazed joint being indicated by the numeral 24. The case 10 is secured to the bushing 23 by means of a nut 25, operating on the threaded shank of the bushing 23, and a lock washer 26. It is here pointed out that in the assembled instrument the case is secured firmly to the bushing 23 whereby the stem 18, sleeve 20 and the head may be considered as a single, rigid unit.

My novel, self-contained arrangement for mounting the instrument in a threaded hole in a wall or receptacle comprises the mounting nut, or hub, 27 and the locking nut 28. The hub 27, provided exteriorly with a pipe thread, normally is freely rotatable about the sleeve 20 and is held in position by the flared sleeve end 21, it being noted that the said flared end is of a diameter smaller than that of the threaded shank of the hub 27. Thus, the hub may be threaded tightly into a cooperating hole formed in, say, a wall 30. It will be apparent that when the hub 27 is tightly seated in the hole the thermometer head may be rotated as desired. The clamping nut 28, which operates on the threaded portion 22 of the sleeve, is then rotated in a direction which will cause the nut to move toward the hub 27. When the nut 28 establishes contact with the flat washer 31, further rotation of the unit causes the sleeve 20 to move upwardly until the flared sleeve end 21 is drawn up tightly against a seat formed in the lower end of the hub. Since the sleeve 20 is secured firmly to the case 10, the operation of the clamping nut 28, as just described, results in a locking of the thermometer head in the desired positional orientation. The coacting surfaces on the hub 27 and the flared sleeve end 21 may be ground whereby such joint is pressure tight and leak proof. Preferably, the surface of the hub is rounded while that of the flared end is conical, as shown, thereby resulting in a line contact between these parts when the thermometer is locked in position. The locking nut 28 and the body of the hub 27 preferably are hexagonal to accept a suitable wrench and the flat washer 31 is desirable to prevent undesirable rotation of the hub as the locking nut is forced into and out of the clamping position.

While I have described my invention as applied specifically to a bimetallic thermometer it will be apparent that the illustrated mounting and clamping arrangement is useful in connection with any device or apparatus designed for threaded mounting on a support and in which the mechanical coupling means preferably is rotatable as a unit apart from the device or a whole.

What I desire to protect by Letters Patent of the United States is set forth in the following claims.

I claim:
1. A swivel type mounting arrangement for attaching to a support an instrument of the class including a case having a stem extending therefrom, said mounting arrangement comprising a sleeve member provided with an axial hole within which the stem is secured, one end of the said stem extending from the said sleeve member, said sleeve member having one end fixedly secured to the case and the other end terminating in an enlarged diameter head; there being an externally threaded intermediate section on the sleeve member; a hub which before mounting is loosely disposed over the sleeve member and including an externally-threaded shank having a diameter exceeding that of the said head of the sleeve member and adapted to be threaded into a cooperating hole in the support; and a clamping nut which before mounting is loosely threaded on the threaded section of the sleeve member; the recited arrangement being such that the said case, stem and sleeve member are rotatable as a unit when the hub is securely threaded into the hole in the support, and such unit is locked in fixed position relative to the hub by rotating the clamping nut to act on the adjacent end of the hub to thereby draw the head of the sleeve member into tight contact with the other end of the hub.

2. The invention as recited in claim 1, wherein the head on the sleeve member includes a conical surface section and the hub end includes a rounded surface section adapted for contact with the said conical surface section.

3. In combination, a thermometer comprising a cup-shaped case, a scale plate carried thereby, a pointer staff, a pointer carried on one end thereof and movable over said scale plate, a hollow stem also carried by said case, a bimetallic coil disposed in the end of said stem remote from said case, one end of said coil being secured to said remote end and the other to said staff, and a swivel-type mounting arrangement for attaching said thermometer to a support comprising a sleeve provided with an axial hole within which the stem is secured, one end of the said stem extending from said sleeve, said sleeve having one end fixedly secured to the case and the other end terminating in an enlarged diameter head, said sleeve having an externally-threaded intermediate section, a hub which before mounting is loosely disposed over the sleeve and including an externally-threaded shank having a diameter exceeding that of the head of the sleeve and adapted to be threaded into a suitable hole in the support, and a clamping nut which before mounting is loosely threaded on said threaded intermediate section, whereby said case, stem and sleeve are rotatable as a unit when the hub is securely threaded into the hole in the support, and such unit may be locked in fixed position relative to the hub by rotating the clamping nut to act on the adjacent end of the hub to thereby draw the head of the sleeve into tight contact with the other end of the hub.

4. A swivel-type mounting arrangement for attaching to a support an instrument of the class including a cup-shaped case carrying a circular scale plate and having a stem extending therefrom and enclosing a staff carrying a pointer movable over said plate and a bimetallic coil for moving said staff, said mounting arrangement comprising a sleeve member provided with an axial hole within which the stem is secured, one end of the said stem extending from the said sleeve member, said sleeve member having one end fixedly secured to the case by means of a bushing, a nut operating on a threaded shank thereof, and a lock washer engaging the inner face of said case, the other end of said sleeve member terminating in an enlarged diameter head, said sleeve also having an externally-threaded intermediate section, a hub which before mounting is loosely disposed over the sleeve member and including an externally-threaded shank having a diameter exceeding that of the head of said sleeve member and adapted to be threaded in a cooperative hole in the support, and a clamping nut which before mounting is loosely threaded on the intermediate threaded section of the sleeve member, whereby the case and its carried scale plate, stem and sleeve member, are rotatable as a unit when the hub is securely threaded into a hole in the support, and such unit may then be locked in fixed position relative to the hub by rotating the clamping nut to act on the adjacent end of the hub to thereby draw the head of the sleeve member into tight contact with the other end of said hub.

References Cited in the file of this patent
UNITED STATES PATENTS

| 1,429,975 | Roth et al. | Sept. 26, 1922 |
| 1,815,567 | Irwin | July 21, 1931 |
| 2,158,751 | Ford | May 16, 1939 |
| 2,202,533 | Mason | May 28, 1940 |
| 2,243,733 | Ford | May 27, 1941 |
| 2,271,193 | Hohmann | Jan. 27, 1942 |
| 2,743,613 | Kebbon | May 1, 1956 |